(12) United States Patent
Takayama

(10) Patent No.: US 10,558,899 B2
(45) Date of Patent: Feb. 11, 2020

(54) IMAGE FORMING APPARATUS, READER WRITER, AND COLORANT CARTRIDGE

(71) Applicant: KYOCERA Document Solutions Inc., Osaka (JP)

(72) Inventor: Ryo Takayama, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/098,071

(22) PCT Filed: Jun. 13, 2017

(86) PCT No.: PCT/JP2017/021725
§ 371 (c)(1),
(2) Date: Oct. 31, 2018

(87) PCT Pub. No.: WO2018/008338
PCT Pub. Date: Jan. 11, 2018

(65) Prior Publication Data
US 2019/0147307 A1 May 16, 2019

(30) Foreign Application Priority Data

Jul. 6, 2016 (JP) .................................. 2016-134587

(51) Int. Cl.
*G06K 15/02* (2006.01)
*G03G 21/16* (2006.01)
(Continued)

(52) U.S. Cl.
CPC ........ *G06K 15/183* (2013.01); *B41J 2/17546* (2013.01); *B41J 29/13* (2013.01);
(Continued)

(58) Field of Classification Search
None
See application file for complete search history.

(56) References Cited

U.S. PATENT DOCUMENTS

2007/0246546 A1* 10/2007 Yoshida ............... G06K 7/0008
235/492
2007/0297814 A1* 12/2007 Kasai ................... G03G 15/553
399/12
(Continued)

FOREIGN PATENT DOCUMENTS

JP 2003-36418 2/2003
JP 2009-128783 6/2009

*Primary Examiner* — Fan Zhang

(57) ABSTRACT

A wireless IC tag (11) is mounted to a toner cartridge (1), and a reader writer (2) reads and writes data from and to the wireless IC tag (11). The toner cartridge (1) includes plural cartridge contact terminals (12), and a load (13) arranged between the cartridge contact terminals (12). The load (13) corresponds to a type of the wireless IC tag (11). The reader writer (2) includes an antenna coil (21) for wireless communication with the wireless IC tag (11), and plural reader writer contact terminals (22) that contact to the plural cartridge contact terminals (12) respectively when the toner cartridge (1) is mounted to this image forming apparatus. Further, a wireless transmission characteristic of the reader writer (2) is adjusted in accordance with the load (13) electronically connected to the reader writer contact terminals (22).

6 Claims, 3 Drawing Sheets

(51) Int. Cl.
  *G03G 15/08* (2006.01)
  *B41J 29/13* (2006.01)
  *B41J 2/175* (2006.01)
  *G03G 21/00* (2006.01)
  *G03G 15/22* (2006.01)
  *G06K 7/10* (2006.01)
  *G06K 19/07* (2006.01)

(52) U.S. Cl.
  CPC ........... *G03G 15/08* (2013.01); *G03G 15/221* (2013.01); *G03G 21/00* (2013.01); *G03G 21/16* (2013.01); *G06K 7/10366* (2013.01); *G06K 19/0723* (2013.01)

(56) References Cited

U.S. PATENT DOCUMENTS

| | | | |
|---|---|---|---|
| 2009/0002746 A1* | 1/2009 | Niwa | B41J 3/4075 358/1.15 |
| 2009/0136242 A1 | 5/2009 | Okamoto et al. | |
| 2011/0241837 A1* | 10/2011 | Suzuki | G06K 7/0008 340/10.1 |
| 2015/0280453 A1* | 10/2015 | Ikefuji | H04B 5/0037 320/108 |
| 2015/0357829 A1* | 12/2015 | Makita | H02J 7/025 307/104 |
| 2016/0285311 A1* | 9/2016 | Masumoto | H02J 50/80 |
| 2017/0261884 A1* | 9/2017 | Kyotani | G03G 15/0863 |
| 2017/0323501 A1* | 11/2017 | Sample | G06K 7/10148 |
| 2018/0215166 A1* | 8/2018 | Tanabe | B41J 2/17566 |
| 2019/0009555 A1* | 1/2019 | Shimizu | B41J 2/175 |
| 2019/0061361 A1* | 2/2019 | Fukushima | B41J 2/17506 |
| 2019/0100018 A1* | 4/2019 | Takahashi | B41J 2/17513 |

* cited by examiner

IMAGE FORMING APPARATUS, READER WRITER, AND COLORANT CARTRIDGE

TECHNICAL FIELD

The present invention relates to an image forming apparatus, a reader writer, and a colorant cartridge.

BACKGROUND ART

In an image forming apparatus, a wireless IC (Integrated Circuit) tag is installed on/in a toner cartridge, and a reader writer reads and write sorts of information from and to the wireless IC tag (See PATENT LITERATURE #1).

Meanwhile, when a communication error occurs between a reader and a wireless IC tag, another apparatus determines that the wireless IC tag is arranged at a null point of the reader, and changes a wireless transmission characteristic of the reader and thereby tries to avoid the null point (See PATENT LITERATURE #2).

CITATION LIST

Patent Literature

PATENT LITERATURE #1: Japanese Patent Application Publication No. 2009-128783.
PATENT LITERATURE #2: Japanese Patent Application Publication No. 2003-036418.

SUMMARY OF INVENTION

Technical Problem

Different types of wireless IC tags are used to different types of toner cartridges for image forming apparatuses, and therefore, in general, a reader writer used in an image forming apparatus has a specification corresponding to a type of a wireless IC tag installed on/in a colorant cartridge (a toner cartridge storing powder colorant or an ink cartridge storing liquid colorant).

For example, required transmission powers are different between of a reader writer for a wireless IC tag of 2 mm square and of a reader writer for a wireless IC tag of 2 cm square, and therefore, the reader writer for a wireless IC tag of 2 mm square and the reader writer for a wireless IC tag of 2 cm square must be designed and manufactured independently.

The present invention has been conceived in view of the aforementioned problem. It is an object of the present invention to achieve an image processing apparatus that enabled to use a common reader writer for different types of wireless IC tags, and a reader writer and a colorant cartridge available for such an image forming apparatus.

Solution to Problem

An image forming apparatus according to the present invention is an image forming apparatus that performs image forming using colorant in a colorant cartridge, and includes: a colorant cartridge on/in which a wireless IC tag is installed; and a reader writer that reads and writes data from and to the wireless IC tag. The colorant cartridge includes plural cartridge contact terminals, and a load arranged between the cartridge contact terminals, the load corresponding to a type of the wireless IC tag. The reader writer includes an antenna coil for wireless communication with the wireless IC tag, and plural reader writer contact terminals that contact to the plural cartridge contact terminals respectively when the colorant cartridge is mounted to the image forming apparatus. Further, the reader writer adjusts a wireless transmission characteristic of the reader writer in accordance with the load electronically connected to the reader writer contact terminals.

A reader writer according to the present invention is a reader writer that reads and writes data from and to a wireless IC tag is installed on/in a colorant cartridge used in an image forming apparatus, and includes: an antenna coil for wireless communication with the wireless IC tag; and plural reader writer contact terminals in positions to contact to plural cartridge contact terminals on the colorant cartridge respectively when the colorant cartridge is mounted to the image forming apparatus. Further, the reader writer adjusts a wireless transmission characteristic in accordance with a load installed between the plural cartridge contact terminals, the load electronically connected to the reader writer contact terminals.

A colorant cartridge according to the present invention is a colorant cartridge used in an image forming apparatus, and includes: a wireless IC tag; plural cartridge contact terminals; and a load arranged between the cartridge contact terminals. The plural cartridge contact terminals are arranged at positions to contact to plural reader writer contact terminals on a reader writer respectively when the colorant cartridge is mounted to the image forming apparatus, the reader writer reading and writing data from and to the wireless IC tag; and the load has an impedance corresponding to a type of the wireless IC tag and thereby causing the reader writer to adjust a wireless transmission characteristic of the reader writer in accordance with the type of the wireless IC tag.

Advantageous Effect of Invention

According to the present invention, a common reader writer can be used for different types of wireless IC tags in an image forming apparatus.

These and other objects, features and advantages of the present invention will become more apparent upon reading of the following detailed description along with the accompanied drawings.

DESCRIPTION OF EMBODIMENTS

Hereinafter, embodiments according to aspects of the present invention will be explained with reference to drawings.

Embodiment 1

Figure 1:
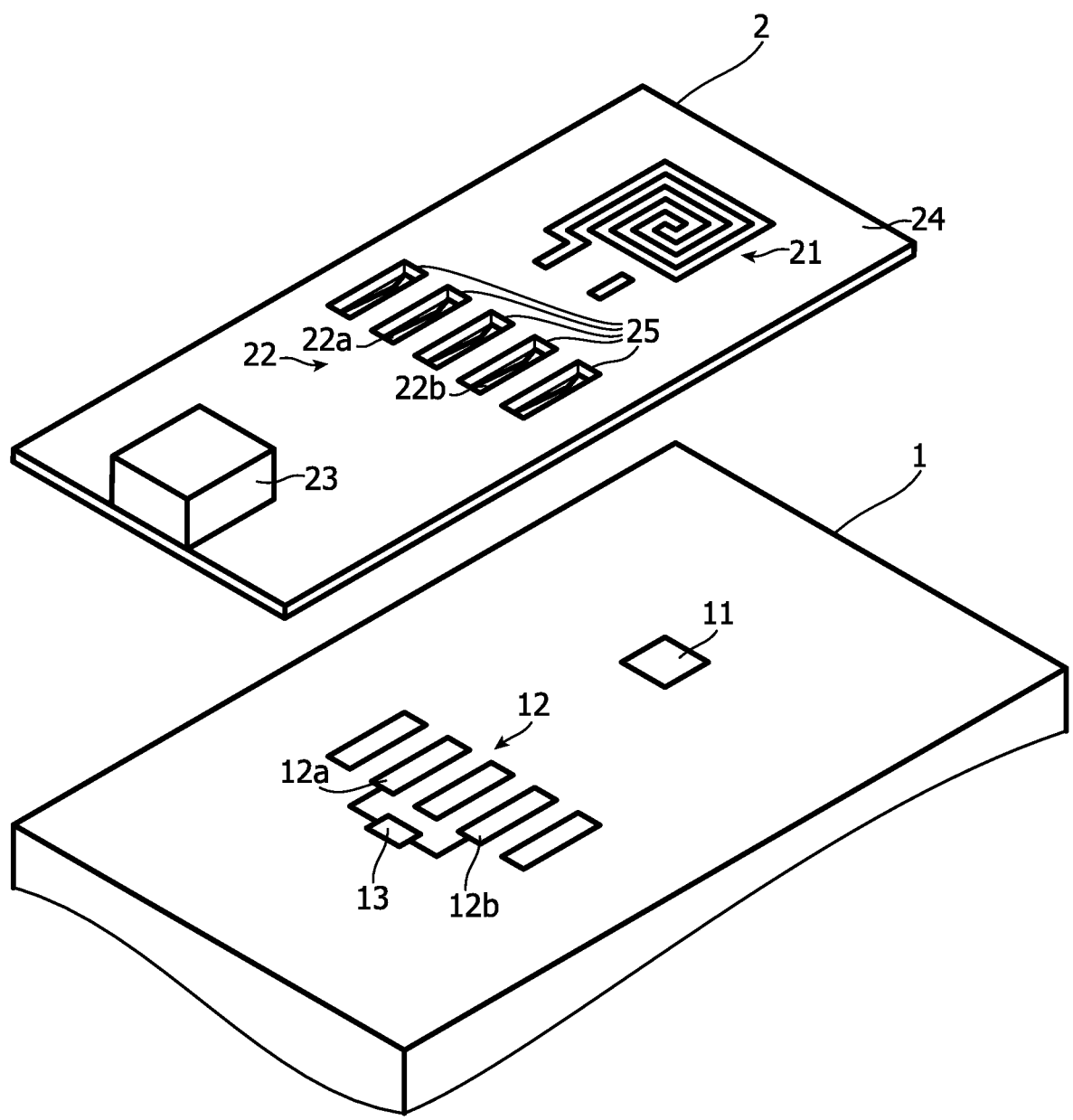
FIG. 1 shows a perspective view diagram that indicates a toner cartridge and a reader writer in an image forming apparatus according to an embodiment of the present invention.

FIG. 1 shows a perspective view diagram that indicates a toner cartridge and a reader writer in an image forming apparatus according to an embodiment of the present invention.

The image forming apparatus shown in FIG. 1 includes a built-in electrophotographic printing device (not shown), a toner cartridge 1 and a reader writer 2. The toner cartridge 1 is an example of a colorant cartridge.

The toner cartridge 1 is enabled to be mounted and demounted to the image forming apparatus, and supplies toner stored inside to a development device in the printing device. The toner cartridge 1 is replaced with a new toner cartridge 1 when the toner stored inside gets empty.

The toner cartridge 1 includes a wireless IC tag 11, plural cartridge contact terminals 12, and a load 13 arranged between the cartridge contact terminals 12. The load 13 corresponds to a type of the wireless IC tag 11.

The wireless IC tag 11 includes a built-in antenna and a built-in non-volatile memory, and performs wireless communication with the reader writer 2 and thereby performs reading and writing from and to the non-volatile memory. In the non-volatile memory, data regarding the image forming apparatus, data regarding this toner cartridge 1 and the like are written.

The plural cartridge contact terminals 12 are arranged at positions to contact to plural reader writer contact terminals 22 on the reader writer 2 respectively when the toner cartridge 1 is mounted to the image forming apparatus.

The load 13 has an impedance corresponding to a type of the wireless IC tag 11 and thereby causing the reader writer 2 to adjust a wireless transmission characteristic of the reader writer 2 in accordance with the type of the wireless IC tag 11. For example, the load 13 is a resistance element.

If the wireless IC tag 11 has a large size (i.e. if an antenna of the wireless IC tag 11 has a large size), then a large resistance value is set on the load 13 because a low transmission power is enough from the reader writer 2 to the wireless IC tag 11; and if the wireless IC tag 11 has a small size (i.e. if an antenna of the wireless IC tag 11 has a small size), then a small resistance value is set on the load 13 because a high transmission power is required from the reader writer 2 to the wireless IC tag 11.

The plural cartridge contact terminals 12 are formed, for example, as metal plates or electrically-conductive wiring patterns. For example, the load 13 is connected to the cartridge contact terminals 12a and 12b with wiring patterns as shown in FIG. 1.

It should be noted that the cartridge contact terminals 12 and the wireless IC tag 11 are not electronically connected to each other.

The reader writer 2 reads and writes data from and to the wireless IC tag 11 installed on/in the toner cartridge 1.

The reader writer 2 includes an antenna coil 21 for wireless communication with the wireless IC tag 11, plural reader writer contact terminals 22, and a connector 23. The plural reader writer contact terminals 22 contact to the plural cartridge contact terminals 12 respectively when the toner cartridge 1 is mounted to the image forming apparatus.

For example, as shown in FIG. 1, the antenna coil 21 is formed on a front surface (or a back surface) of a substrate 24, and an end of each of the reader writer contact terminals 22 as metal plate is fixed on the back surface of the substrate 24. Further, in the substrate 24, holes 25 are formed in order to assure motion ranges of the reader writer contact terminals 22 as metal plate.

The connector 23 is a connector to connect to a main controller through a cable.

Figure 2:
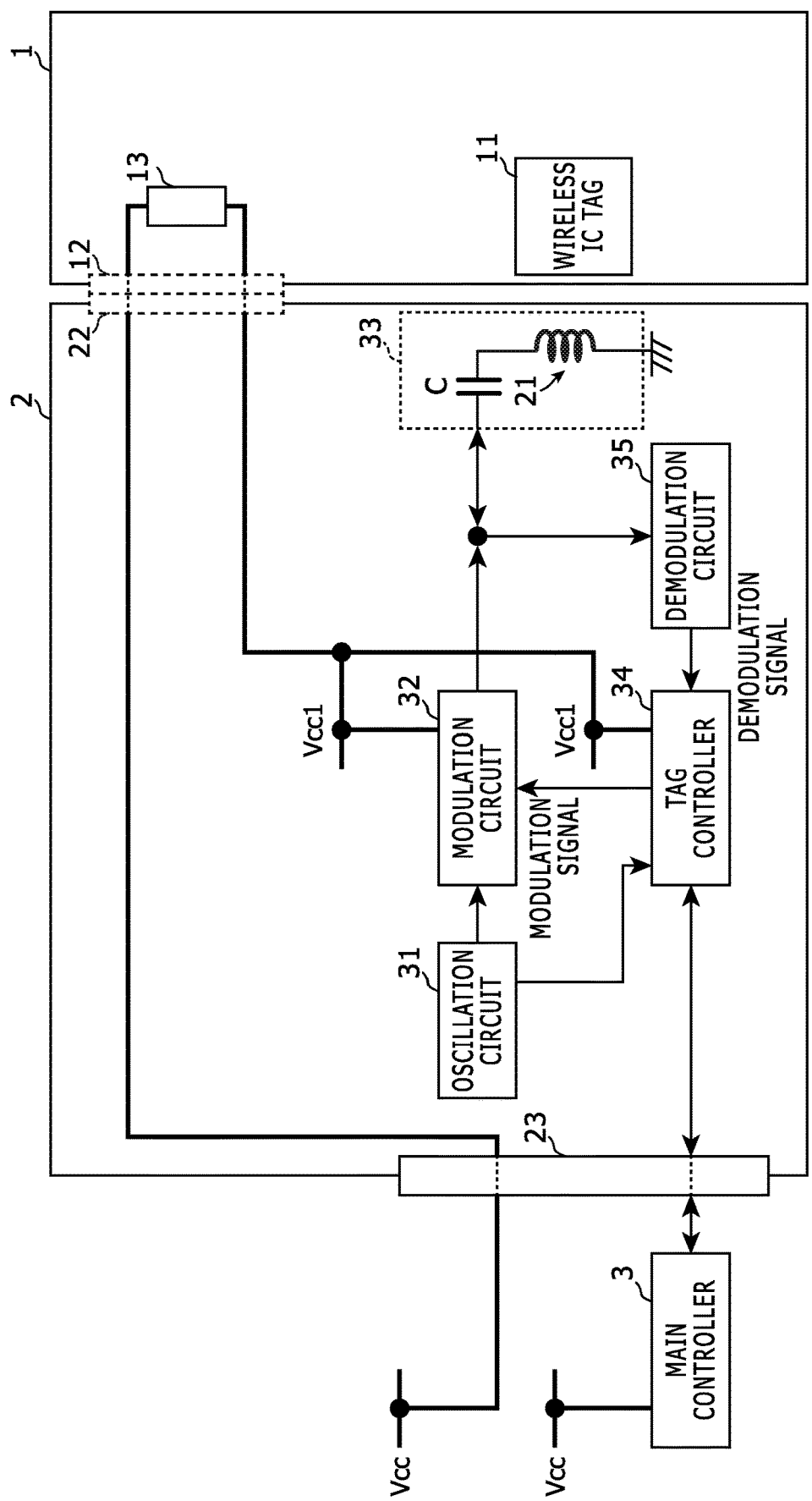
FIG. 2 shows a block diagram that indicates an electronic configuration of the image forming apparatus in Embodiment 1.

In FIG. 2, the other elements and the other wiring patterns are not depicted.

Further, the reader writer 2 adjusts a wireless transmission characteristic thereof in accordance with the load 13 electronically connected to the reader writer contact terminals 22.

FIG. 2 shows a block diagram that indicates an electronic configuration of the image forming apparatus in Embodiment 1.

As shown in FIG. 2, in the image forming apparatus, the reader writer 2 is connected through the connector 23 to a main controller 3 and power supply Vcc of the image forming apparatus. The main controller 3 controls internal devices (a printing device, an image scanning device, a communication device, an operation device and the like) of the image forming apparatus and thereby performs sorts of jobs. The main controller 3 is a computer that includes a processor such as CPU (Central Processing Unit) that executes a control program, an ASIC (Application Specific Integrated Circuit) and/or the like.

Further, the reader writer 2 includes an oscillation circuit 31, a modulation circuit 32, a resonance circuit 33, a tag controller 34, and a demodulation circuit 35.

The oscillation circuit 31 generates as a carrier wave a reference signal with a predetermined single frequency (e.g. 13.56 MHz).

The modulation circuit 32 operates with a power supply voltage Vcc1, and modulates the carrier wave with a modulation signal in accordance with a predetermined modulation manner and thereby generates a modulated signal. In this embodiment, the modulation circuit 32 generates the modulated signal in accordance with ASK (Amplitude Shift Keying) modulation.

When there are no modulation signals, the modulation circuit 32 supplies the carrier wave to the antenna coil 21 without the modulation.

The resonance circuit 33 is a series resonance circuit that includes the antenna coil 21 and a capacitor C.

The tag controller 34 performs an encoding process and a decoding process of data for reading and writing the data from and to the wireless IC tag 11. The tag controller 34 is a computer that includes a processor such as CPU that executes a control program, an ASIC and/or the like.

Specifically, the tag controller 34 (a) performs data communication with the main controller 3, (b) receives from the main controller 3 data to be transmitted to the wireless IC tag 11 and performs line encoding of the received data and thereby generates a modulation signal, and (c) performs line decoding of demodulation signal from the demodulation circuit 35 and thereby generates received data and transmits the received data to the main controller 3.

The demodulation circuit 35 demodulates a modulated wave that the wireless IC tag 11 modulated in accordance with a predetermined modulation manner and thereby generates the demodulation signal.

Further, when the toner cartridge 1 is mounted to the image forming apparatus, as shown in FIG. 2, the plural reader writer contact terminals 22 contact to the plural cartridge contact terminals 12, and both are electronically connected to each other.

In Embodiment 1, among the plural reader writer contact terminals 22, the plural reader writer contact terminal 22a is electronically connected to the connector 23 (a terminal connected to power supply Vcc of the image forming apparatus in the connector 23); and among the plural reader writer contact terminals 22, the plural reader writer contact terminal 22b is electronically connected to power supply terminals of the modulation circuit 32, the tag controller 34 and the like.

To a power supply terminal of an internal circuit other than the modulation circuit 32 and the tag controller 34 in the reader writer 2, the reader writer contact terminal 22b may be electronically connected or the terminal connected to the power supply Vcc of the image forming apparatus in the connector 23 may be electronically connected.

It should be noted that the aforementioned terminals are connected to each other with a wiring pattern or the like.

When the toner cartridge 1 is mounted to the image forming apparatus, the reader writer contact terminal 22a contacts to the cartridge contact terminal 12a, and the reader writer contact terminal 22b contacts to the cartridge contact terminal 12b. Further, the load 13 is arranged between the cartridge contact terminal 12a and the cartridge contact terminal 12b. Therefore, the power supply Vcc of the image forming apparatus is electronically connected through the load 13 of the toner cartridge 1 to power supply terminals of the modulation circuit 32, the tag controller 34 and the like in the reader writer 2.

Thus, in Embodiment 1, the reader writer 2 adjusts a power supply voltage Vcc1 of the modulation circuit 32 in accordance with the load 13, thereby adjusts a transmission power of the antenna coil 21 and thereby adjusts a wireless transmission characteristic of the reader writer 2.

Further, the main controller 3 performs data communication with the tag controller 34, and determines that the wireless IC tag 11 does not exist if there are no responses from the tag controller 34.

When the toner cartridge 1 is mounted to the image forming apparatus, the tag controller 34 operates and performs communication with the main controller 3 because power supply is provided to the tag controller 34 though the load. Contrarily, when the toner cartridge 1 is not mounted to the image forming apparatus, the tag controller 34 does not operate and can not perform communication with the main controller 3 because power supply is not provided to the tag controller 34. Therefore, in this case, the main controller 3 does not receive any responses from the tag controller 34 and determines that the wireless IC tag 11 does not exist.

The following part explains a behavior of the image forming apparatus in Embodiment 1.

When the toner cartridge 1 is mounted to the image forming apparatus, as shown in FIG. 2, the toner cartridge 1 is electronically connected to the reader writer 2, and the reader writer 2 gets capable of communication with the wireless IC tag 11.

Consequently, the modulation circuit 32 and the like operate with the power supply voltage Vcc1 corresponding to the load 13.

When writing data to the wireless IC tag 11, the main controller 3 transmits a write command and the data to be written to the tag controller 34.

The tag controller 34 encodes the write command and the data and thereby generates a modulation signal and provides the modulation signal to the modulation circuit 32.

The modulation circuit 32 modulates a carrier wave provided from the oscillation circuit 31 with the modulation signal and thereby generates a modulated signal and outputs the modulated signal to the resonance circuit 33. Here, the modulated signal with a power corresponding to the load 13 is outputted to the resonance circuit 33.

The antenna coil 21 of the resonance circuit 33 and the wireless IC tag 11 are electromagnetically coupled; and the modulated signal is transmitted from the antenna coil 21 to the wireless IC tag 11, the modulated signal is demodulated to a demodulation signal (i.e. original modulation signal) in the wireless IC tag 11, the demodulation signal is decoded to the original write command and the original data, and the data is written into the non-volatile memory in the wireless IC tag 11.

When reading data from the wireless IC tag 11, the main controller 3 transmits a read command to the tag controller 34.

The tag controller 34 encodes the read command and thereby generates a modulation signal and provides the modulation signal to the modulation circuit 32.

The modulation circuit 32 modulates a carrier wave provided from the oscillation circuit 31 with the modulation signal and thereby generates a modulated signal and outputs the modulated signal to the resonance circuit 33. Here, the modulated signal with a power corresponding to the load 13 is outputted to the resonance circuit 33.

The modulated signal is transmitted from the antenna coil 21 to the wireless IC tag 11, the modulated signal is demodulated to a demodulation signal (i.e. original modulation signal) in the wireless IC tag 11, the demodulation signal is decoded to the original read command, and the data specified by the read command is read from the non-volatile memory in the wireless IC tag 11.

The read data is line-encoded and thereby is converted to a modulation signal, and a carrier wave is modulated with the modulation signal. In the reader writer 2, the demodulation circuit 35 detects and demodulates the carrier wave and outputs its demodulation signal to the tag controller 34.

The tag controller 34 decodes the demodulation signal and thereby obtains the data read from the wireless IC tag 11, and transmits the data to the main controller 3.

As mentioned, in Embodiment 1, the wireless IC tag 11 is mounted to the toner cartridge 1, and the reader writer 2 reads and writes data from and to the wireless IC tag 11. The toner cartridge 1 includes plural cartridge contact terminals 12, and a load 13 arranged between the cartridge contact terminals 12, and the load 13 corresponds to a type of the wireless IC tag. The reader writer 2 includes an antenna coil 21 for wireless communication with the wireless IC tag 11, and plural reader writer contact terminals 22 that contact to the plural cartridge contact terminals 12 respectively when the toner cartridge 1 is mounted to this image forming apparatus. Further, a wireless transmission characteristic of the reader writer 2 is adjusted in accordance with the load 13 electronically connected to the reader writer contact terminals 22.

Consequently, changing a circuit configuration of the reader writer 2 is not required for different types of the wireless IC tags 11 and a common reader writer 2 can be used for different types of wireless IC tags 11 because a wireless transmission characteristic of the reader writer 2 is adjusted in accordance with the load 13.

Further, as mentioned, a communication error may occur due to a null point or the like between the reader writer 2 and the wireless IC tag 11, and according to the aforementioned background art, it is difficult to distinguish that the communication error due to a null point or the like disables the communication with the wireless IC tag and that the wireless IC tag itself does not exist.

Contrarily, in Embodiment 1, if there are no responses from the tag controller 34, then the main controller 3 determines that the wireless IC tag 34 does not exist, and if there is a response from the tag controller 34 but reading and writing can not be performed from and to the wireless IC tag 11, then the main controller 3 determines that the communication error occurs due to a null point or the like.

Embodiment 2

In Embodiment 2, a Q value of the resonance circuit 33 in the reader writer 2 is adjusted in accordance with the load 13 of the toner cartridge 1, and thereby a wireless transmission characteristic of the reader writer 2 is adjusted in accordance with the wireless IC tag 11.

Figure 3:
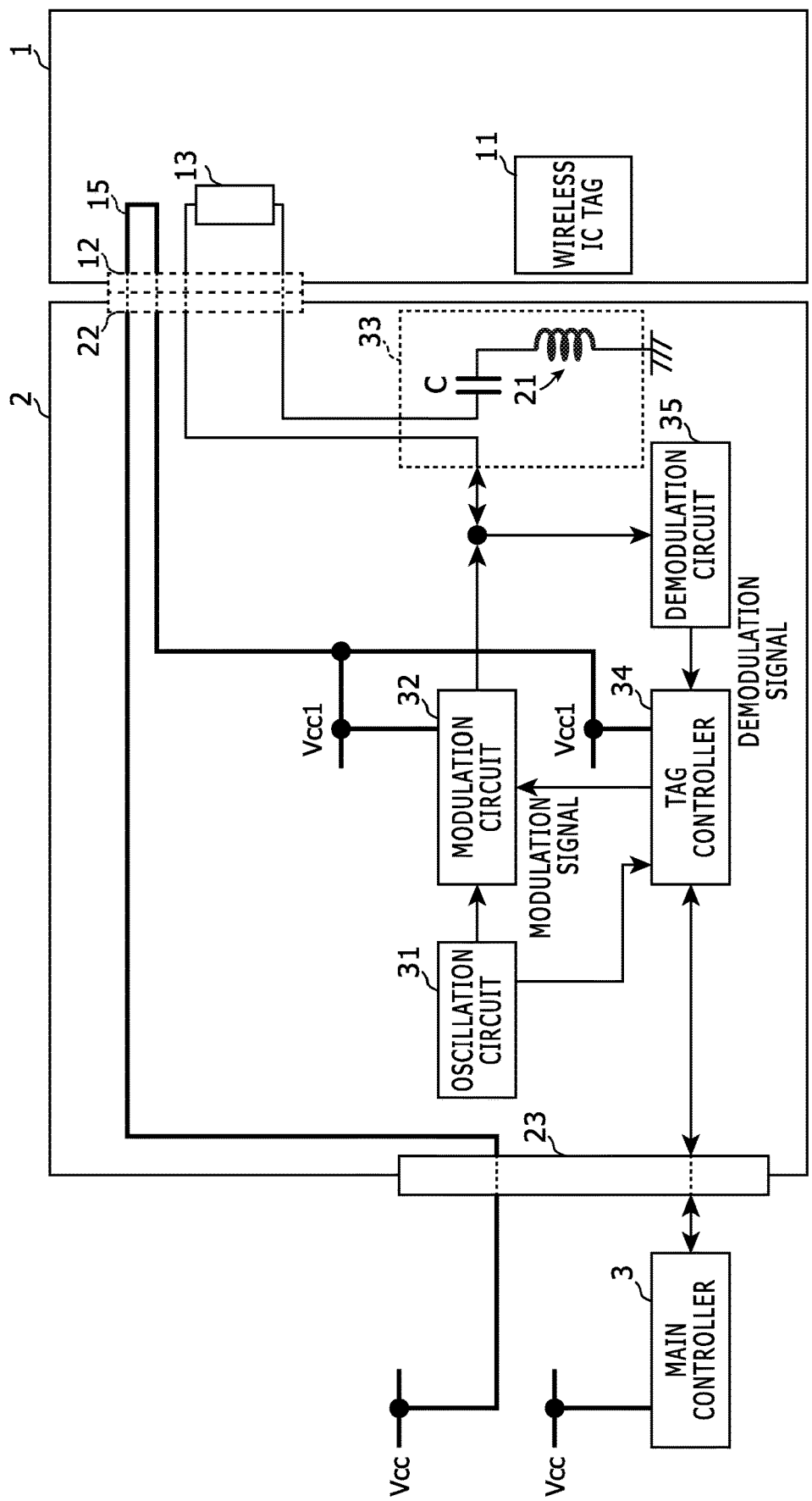
FIG. 3 shows a block diagram that indicates an electronic configuration of the image forming apparatus in Embodiment 2.

FIG. 3 shows a block diagram that indicates an electronic configuration of the image forming apparatus in Embodiment 2.

For example, as shown in FIG. 3, in Embodiment 2, among the plural reader writer contact terminals 22, contact terminals 22a and 22b corresponding to two cartridge contact terminals 12a and 12b connected to the load 13 are connected to the resonance circuit in series (or in parallel). Consequently, the Q value of the resonance circuit 33 is determined in accordance with a resistance value (or an impedance value) of the load 13. In Embodiment 2, in the aforementioned manner, a wireless transmission characteristic of the reader writer 2 is adjusted with the load 13 of the toner cartridge 1.

If the wireless IC tag 11 has a large size, then the Q value of the resonance circuit 33 is set to be small; and if the wireless IC tag 11 has a small size, then the Q value of the resonance circuit 33 is set to be large. Thus, in Embodiment 2, its output impedance is adjusted without changing its resonance frequency.

As shown in FIG. 3, among the plural reader writer contact terminals 22, other two contact terminals 22 are connected to the connector 23 (a terminal connected to the power supply Vcc of the image forming apparatus in the connector 23) and the power supply terminals of the modulation circuit 32, the tag controller 34 and the like, and two cartridge contact terminals 12 corresponding to these two reader writer contact terminals 22 are short-circuited with a wiring pattern 15 or the like. Consequently, as well as in Embodiment 1, the main controller 3 is capable of determining whether the wireless IC tag 11 exists or not.

As mentioned, in Embodiment 2, as well as in Embodiment 1, changing a circuit configuration of the reader writer 2 is not required for different types of the wireless IC tags 11 and a common reader writer 2 can be used for different types of wireless IC tags 11 because a wireless transmission characteristic of the reader writer 2 is adjusted in accordance with the load of the toner cartridge 1.

Further, in Embodiment 2, the main controller 3 determines that the wireless IC tag 11 does not exist if there are no responses from the tag controller 34 and determines that a communication error occurs due to a null point or the like if the wireless IC tag 11 exists but reading and writing can not be performed from and to the wireless IC tag 11.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in Embodiment 1 or 2, the number of the cartridge contact terminals 12 and the number of the reader writer contact terminals 22 are 5, but alternatively may be another number equal to or larger than 2.

Further, in Embodiment 1 or 2, in a case that an ink cartridge is mounted to the image forming apparatus, an ink cartridge is used instead of the toner cartridge 1, and the ink cartridge includes the wireless IC tag 11, the cartridge contact terminals 12 and the load 13 as well as the toner cartridge 1.

Furthermore, in Embodiment 1 or 2, for communication between the main controller 3 and the tag controller 34, I2C communication may be used in order to avoid influence of the power supply voltage difference.

Furthermore, in Embodiment 1 or 2, the load 13 is a single element, but alternatively may be a circuit such as a voltage divider. In such a case, the cartridge contact terminals 12 and the reader writer contact terminals 22 of which a number is required for this circuit are arranged and used.

INDUSTRIAL APPLICABILITY

For example, the present invention is applicable to an image forming apparatus.

The invention claimed is:

1. An image forming apparatus that performs image forming using colorant in a colorant cartridge, comprising:
   a colorant cartridge on/in which a wireless IC tag is installed; and
   a reader writer that reads and writes data from and to the wireless IC tag;
   wherein the colorant cartridge comprises plural cartridge contact terminals, and a load arranged between the cartridge contact terminals, the load corresponding to a type of the wireless IC tag; and
   the reader writer (a) comprises an antenna coil for wireless communication with the wireless IC tag, and plural reader writer contact terminals that contact to the plural cartridge contact terminals respectively when the colorant cartridge is mounted to the image forming apparatus, and (b) adjusts a wireless transmission characteristic of the reader writer in accordance with the load electronically connected to the reader writer contact terminals.

2. The image forming apparatus according to claim 1 wherein the reader writer (a) further comprises a modulation circuit that provides a modulated signal or a carrier wave to the antenna coil, and (b) adjusts a power supply voltage of the modulation circuit in accordance with the load, thereby adjusts a transmission power of the antenna coil, and thereby adjusts a wireless transmission characteristic of the reader writer.

3. The image forming apparatus according to claim 1 wherein the reader writer (a) further comprises a capacitor of which a resonance circuit is comprised with the antenna coil, and (b) adjusts a Q value of the resonance circuit and thereby adjusts a wireless transmission characteristic of the reader writer.

4. The image forming apparatus according to claim 1, further comprising a main controller;
   wherein the reader writer further comprises a tag controller that performs an encoding process and a decoding process of data for reading and writing the data from and to the wireless IC tag;
   power supply of the tag controller is provided through the plural cartridge contact terminals; and
   the main controller performs data communication with the tag controller, and determines that the wireless IC tag does not exist if there are no responses from the tag controller.

5. A reader writer that reads and writes data from and to a wireless IC tag is installed on/in a colorant cartridge used in an image forming apparatus, comprising:
- an antenna coil for wireless communication with the wireless IC tag; and
- plural reader writer contact terminals in positions to contact to plural cartridge contact terminals on the colorant cartridge respectively when the colorant cartridge is mounted to the image forming apparatus;
- wherein the reader writer adjusts a wireless transmission characteristic in accordance with a load installed between the plural cartridge contact terminals, the load electronically connected to the reader writer contact terminals.

6. A colorant cartridge used in an image forming apparatus, comprising:
- a wireless IC tag;
- plural cartridge contact terminals; and
- a load arranged between the cartridge contact terminals;
- wherein the plural cartridge contact terminals are arranged at positions to contact to plural reader writer contact terminals on a reader writer respectively when the colorant cartridge is mounted to the image forming apparatus, the reader writer reading and writing data from and to the wireless IC tag; and
- the load has an impedance corresponding to a type of the wireless IC tag and thereby causing the reader writer to adjust a wireless transmission characteristic of the reader writer in accordance with the type of the wireless IC tag.

* * * * *